(12) United States Patent
Giuntini et al.

(10) Patent No.: US 8,422,256 B2
(45) Date of Patent: Apr. 16, 2013

(54) CONTROL SYSTEM FOR HIGH-EFFICIENCY OPERATION IN PARALLEL INVERTER INSTALLATIONS

(75) Inventors: Lorenzo Giuntini, Locarno (CH); Silvio Colombi, Losone (CH)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 12/847,227

(22) Filed: Jul. 30, 2010

(65) Prior Publication Data

US 2012/0026764 A1 Feb. 2, 2012

(51) Int. Cl.
*H02M 7/537* (2006.01)
*H02M 7/155* (2006.01)

(52) U.S. Cl.
USPC ............... 363/71; 363/131; 307/45; 307/46; 307/58; 307/64; 307/65; 307/66

(58) Field of Classification Search ............ 363/71, 363/131; 307/45, 46, 58, 64, 65, 66
See application file for complete search history.

(56) References Cited

U.S. PATENT DOCUMENTS

| | | | |
|---|---|---|---|
| 5,334,877 A | 8/1994 | Mohan et al. | |
| 5,612,580 A * | 3/1997 | Janonis et al. | 307/64 |
| 6,917,124 B2 * | 7/2005 | Shetler et al. | 307/66 |
| 7,145,266 B2 | 12/2006 | Lynch et al. | |
| 7,372,177 B2 | 5/2008 | Colombi et al. | |
| 7,456,520 B2 | 11/2008 | Colombi et al. | |
| 7,566,988 B2 | 7/2009 | Heber et al. | |
| 7,893,346 B2 * | 2/2011 | Nachamkin et al. | 136/244 |
| 7,948,118 B2 * | 5/2011 | Chambon | 307/66 |
| 2006/0164782 A1 * | 7/2006 | Colombi et al. | 361/143 |
| 2008/0078436 A1 * | 4/2008 | Nachamkin et al. | 136/244 |

* cited by examiner

*Primary Examiner* — Bao Q Vu
(74) *Attorney, Agent, or Firm* — GE Global Patent Operation; Catherine J. Toppin

(57) ABSTRACT

A control system for parallel connected inverter legs energized by a power source and configured for servicing a load is disclosed. The invention facilitates the number of running inverter legs to adaptively react to changes in the load by dynamically switching various inverter legs "on" or "off" in response to variations in load demand, while continuing magnetization of an output transformer connected with an "off" inverter leg via a back-feed from another output transformer of an "on" inverter leg, greatly improving the dynamic response to load changes. This design enables a fast reaction to load changes with "off" inverter legs transitioning to on-line operation instantaneously.

22 Claims, 3 Drawing Sheets

CONTROL SYSTEM FOR HIGH-EFFICIENCY OPERATION IN PARALLEL INVERTER INSTALLATIONS

BACKGROUND OF THE INVENTION

The present disclosure relates generally to inverters connected in parallel, more specifically to uninterruptible power supplies (UPSs), and particularly to control systems for economic control thereof.

UPSs are employed in a variety of applications where a constant source of power is desired at a load. Double conversion UPSs are often the preferred choice for critical load protection. Double conversion UPSs offer the maximal protection level as the load is always fed by the inverter. Particularly, double-conversion transformer-based UPSs offer load isolation in addition to complete power conditioning. While providing optimum protection, double conversion transformer-based topology may not offer the highest efficiency. Additionally, the system load in some installations may be significantly far from optimal UPS efficiency (particularly in redundant 2N, 2(N+1) installations).

Methods for providing efficiency improvement in low-load conditions by switching "off" some UPSs (or section of the UPSs) in parallel UPS installations have been known. However, significant load steps exceeding available capacity will force the system to switch the critical load to bypass while additional units are brought on-line. This potentially exposes the load to power quality events occurring on the incoming utility. This issue particularly affects transformer-based UPSs, where the transition from off-line to on-line operation requires the transformer to be magnetized. Therefore, such known methods are typically applied only when the critical load is either stable or has predictable variation.

For parallel UPS systems, switching off one or more sections of the UPSs can reduce UPS losses. One particular solution is to switch off the inverter section of one or more units in low-load conditions and re-starting these inverters as the load increases. However, in transformer-based UPSs the inverter start-up is somewhat lengthy, as a soft-start is required when energizing the inverter output transformer.

Accordingly, there is a need for a system that allows the use of a double conversion UPS that overcomes the aforementioned drawbacks.

BRIEF DESCRIPTION OF THE INVENTION

An embodiment of the invention includes a control system for inverters connected in parallel energized by a power source for servicing a load. The control system includes a first inverter being switchable "on" or "off". The inverter has an inverter feed path which connects power source, the inverter, and an output transformer in circuit to feed the load. The control system also has at least one second inverter being switchable "on" or "off". The second inverter includes an inverter feed path connected with the power source, the inverter and an output transformer in circuit to feed the load. The output transformer of the second inverter feed path is configured to remain magnetized via a back-feed from the output transformer of the first inverter feed path. The control system further includes control circuitry in electrical communication with each inverter and means for determining the demand of the load wherein the control circuitry is configured to communicate a signal to each inverter for switching it "on" or "off" to accommodate increases or decreases in load demand.

Another embodiment includes a method for controlling a system having a first inverter and at least one second inverter energized by a power source and connected in parallel for servicing a load. Each inverter having a feed path connected with the power source, and an output transformer in circuit with the load, The method includes determining the demand of the load, sending output signals from control circuitry to one or more of the inverters to switch "on" or "off" in response to increases or decreases in load demand, respectively, and maintaining magnetization of the output transformer sections of the inverters switched "off" via a back-feed from the output transformer of the first inverter.

BRIEF DESCRIPTION OF THE DRAWINGS

Referring to the exemplary drawings wherein like elements are numbered alike in the accompanying Figures.

DETAILED DESCRIPTION OF THE INVENTION

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Figure 1:
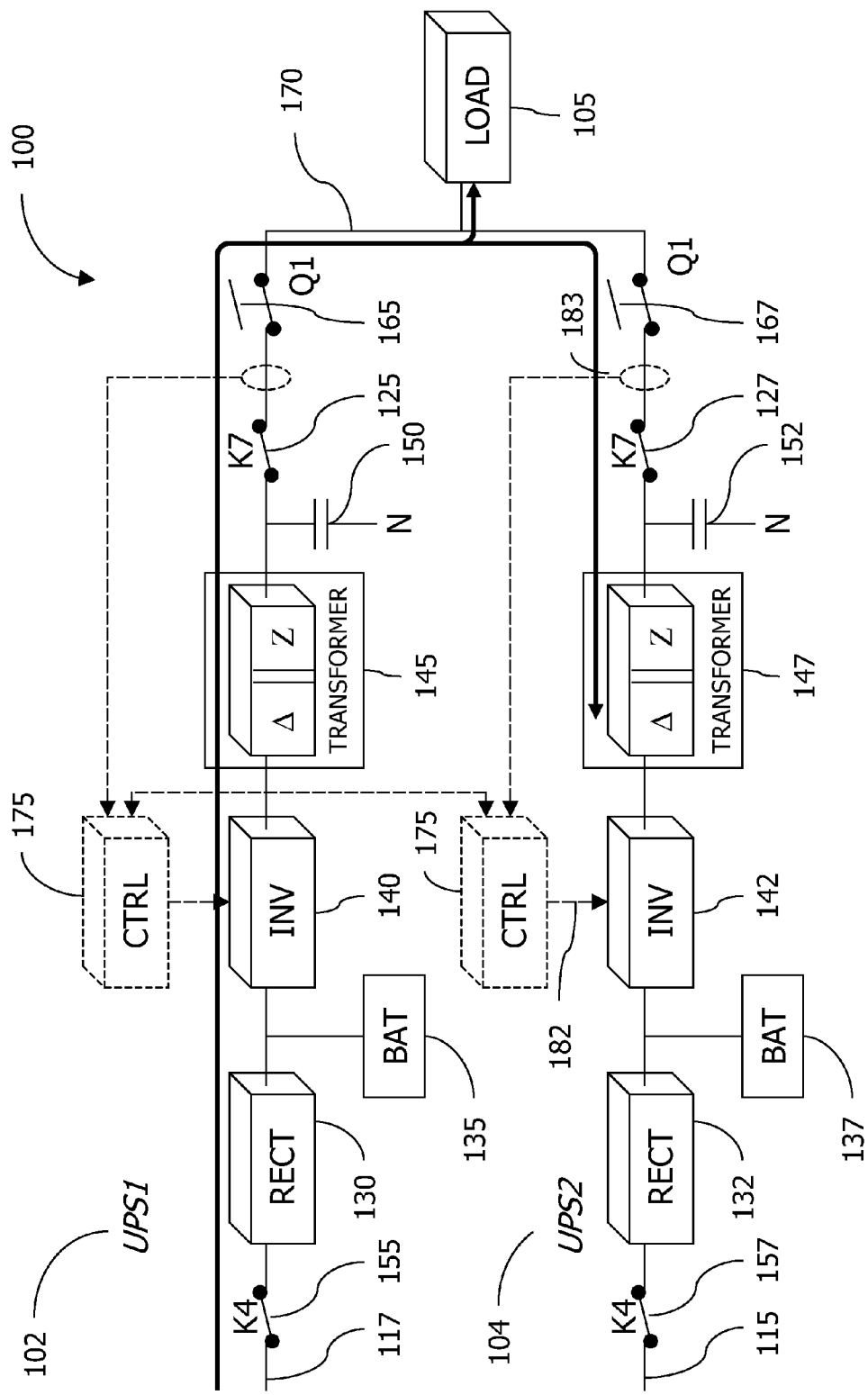
FIG. 1 depicts in one-line diagram form an exemplary UPS system in accordance with an embodiment of the invention.

FIG. 1 illustrates an exemplary embodiment of the invention that comprises a control system for parallel inverter legs of a circuit. In this particular embodiment, a control system 100 for an uninterruptible power supply (UPS) is energized by an AC power source and connected in parallel for servicing a load 105. The control system 100 includes a first UPS (UPS1) 102 and a second UPS (USP2) 104 connected in parallel. UPS1 102 includes a feed path 117 connected with an AC power source (not shown). UPS2 includes a similar feed path 115. Feed paths 117 and 115 are engageable with the load 105 via control switches (K7) 125 and 127 to deliver an inverter current to the load 105. In an embodiment, the K7 switch is a remote controllable contactor. In other embodiments, the K7 switch may be replaced with a static switch.

The feed path 117 includes a rectifier 130, a battery 135, an inverter 140, an output transformer 145 and filtering capacitors 150. Additional control switches include disconnect switches (K4) 155 and (Q1) 165, which may be employed for additional protection and/or maintenance. In an embodiment, switch (K4) 155 is a circuit breaker and switch (Q1) 165 is a manual disconnect.

Similarly, the feed path 115 of UPS2 includes a rectifier 132, a battery 137, an inverter 142, an output transformer 147, filtering capacitors 152, and disconnect switches (K4) 157 and (Q1) 167. Control switches, 157 and 167 can be identical to switches 155 and 165, respectively. Inverters 140 and 142 are in circuit with rectifiers 130 and 132 and inverters 140 and 142 are configured to be switchable "on" or "off".

Although the invention in FIG. 1 is shown with only two UPSs in parallel, the system is configured to work with multiple UPS systems arranged in parallel. Additional UPSs include similar components as UPS1 and UPS2.

The control system 100 further includes control circuitry 175 in electrical communication with each inverter 140 and 142 and means for determining the demand of the load 105. The demand of load can be determined by sensing with transducers, by making calculations involving other measurements, or any other reasonable means known in the art. The control circuitry 175 is configured to communicate a signal 182 to the inverter for switching it "on" or "off" to accommodate increases or decreases in load demand. The intricacies of control circuitry 175 are discussed in more detail below.

Under normal operation, all UPSs in a parallel installation are feeding the load 105 via the feed path 115 and 117. In low-load conditions, a subset of the UPSs in the parallel system are sufficient to deliver reliable power to the load 105. Higher efficiency operation is achieved by switching off the inverter section 140, 142 of one or more UPSs, while the corresponding output transformers 145, 147 are maintained magnetized via back-feed from output of the output transformer from the remaining UPSs.

For example, in a control system as illustrated in FIG. 1, if the control circuitry 175 detects that there is a decrease in the load demand of load 105, a signal is communicated to inverter 142 to switch "off". While power is shut off to inverter 142, output transformer 147 remains magnetized via a back-feed 170 from the output transformer 145 of the UPS1 102 because output transformer 147 is in circuit with the inverter 142 and in circuit with the load 105. Control circuitry 175 can also send a signal to inverter 142 to switch "on" if it detects an increase in the demand of load 105, or if there is a problem detected with UPS1. Because output transformer 147 remains magnetized, the typical "warm up" time needed to start-up inverter 142 is virtually cancelled, greatly improving the dynamic response to load changes.

Figure 2:
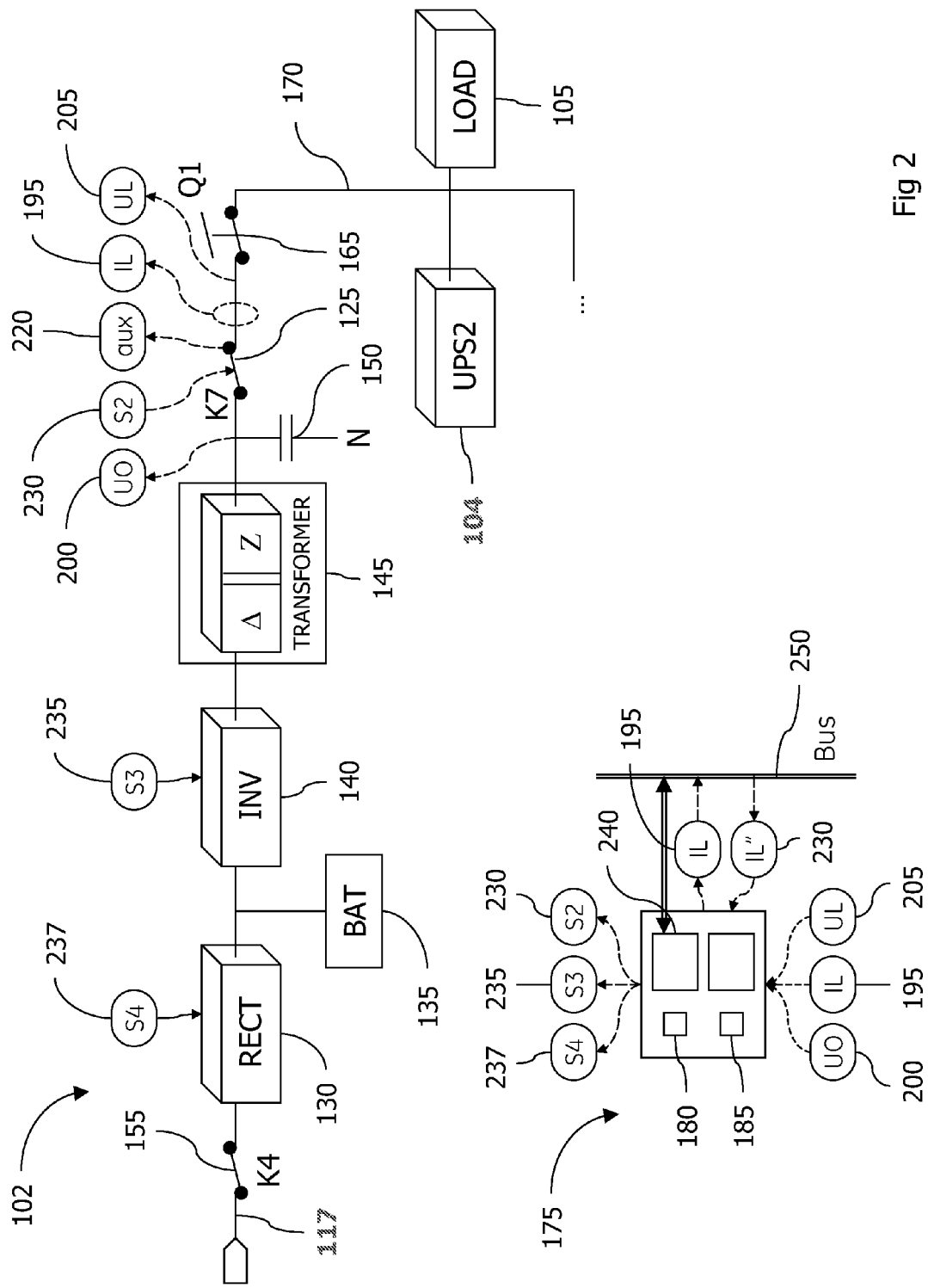
FIG. 2 depicts a similar one-line diagram form to that of FIG. 1 for use in accordance with an embodiment of the invention.

Referring now to FIG. 2, the relationship between UPS1 and control circuitry 175 is shown. While only UPS1 is shown in detail in FIG. 2, it is contemplated that there are additional UPSs connected in parallel to the system. Control circuitry 175 includes a processing circuit 180 and a storage medium 185, readable by the processing circuit 180, and storing instructions for execution by the processing circuit for controlling the UPSs.

In an embodiment, input signals to control circuitry 175 include inverter load currents (IL) 195 and load voltages (UL) 205 that are generated by any sensor suitable for the intended purpose. Another input signal to control system 175 may be (aux) 220 that is provided by an auxiliary contact (not specifically shown, but represented also by reference numeral 220) at switch (K7) 125 and identifies the on/off state of the main contacts of switch 125.

The leakage inductance of output transformer 145 and the output capacitor 150 are used together to filter the inverter voltage to produce a filtered output voltage (U0) 200.

In an embodiment, output signals from control circuitry 175 include a command signal (S2) 230 to switch 125, a command signal (S3) 235 to inverter 140, and a command signal (S4) 237 to rectifier 130.

In one embodiment, output signal 230, 235 and 237 may originate from control circuitry 175. However, in another embodiment, the same output signal or any combination thereof may be analog, may originate from another source (not shown) and may be monitored and used by control circuitry 175. It is also contemplated that there can be complete analog control wherein control circuitry as described above would not be needed.

Additionally, control circuitry 175 may be implemented as a centralized control for the parallel UPS system, or as a distributed controllers operating in a master-slave configuration or in a peer-to-peer fashion. In the latter case, an embodiment includes a fast communication link 250 between the controllers. It will be appreciated that the controllers may exchange a variety of information for synchronous operation. Particularly, they may exchange output power information in order to determine the load demand and achieve optimal load sharing.

Storage medium 185 stores instructions for execution by the processing circuit 180. The instructions can include directions for causing magnetization of the output transformers 145 and 147. The instructions can also include directions for switching on or off the control switches of the inverter section 140 or 142 of one or more UPSs in response to changes in the demand of load 105.

While FIGS. 1 and 2 depict certain switches (Q1, K4, K7) either open or closed, it will be appreciated that control circuitry 175 may send appropriate control signals to change the state of these switches. Particularly, K7 switch is maintained closed for back-feed magnetization of the output transformer.

During normal operation, the rectifier 130 converts the input power supply 117 to regulated DC to charge the battery 135 as well as supply power to the inverter 140. The inverter 140 converts the DC to an AC voltage. During an absence of power from utility supply 117, the inverter 140 draws power from the battery 135 and continues to supply output power.

In an embodiment, the inverter 140 is an inverter bridge driven by gating pulses to electronic switches, whereas these switches may be IGBTs, but more generally they could be any switchable power semiconductor. The "on" and "off" control signals are logic signals controlling gate pulses to the switches. When an "on" signal is sent the switches are commanded alternatively open and closed off according to the regulation algorithm. If an "off" command is sent, the switches are switched off.

The control circuitry 175 constantly monitors the system load 105, and responds to load variation by switching on the inverter section on more UPSs when the load increases (correspondingly, by switching off the inverter section on more UPSs when the load decreases). The inverter section is switched on by sending a control signal 235 to the inverter 140. In the event that the control circuitry 175 receives an input signal indicating a decrease in demand of load 105, control circuitry 175 can send a corresponding output signal to the inverter 140 (or 142) signalling the inverter to power "off". In order for the switched off inverter to be properly switched on at the required power, the corresponding output transformer 145 or 147 needs to be already magnetized.

Referring back to FIG. 1, switches 125 and 127 (K7) are maintained closed to allow magnetization of transformers 145 or 147 via back-feed from AC output bus 170. If a fault is detected on one of the UPSs currently feeding the load via the feed path, or an increase in the demand of load 105 is detected, a signal can be sent from control circuitry 175 to the inverter section of a UPS to switch "on".

Figure 3:
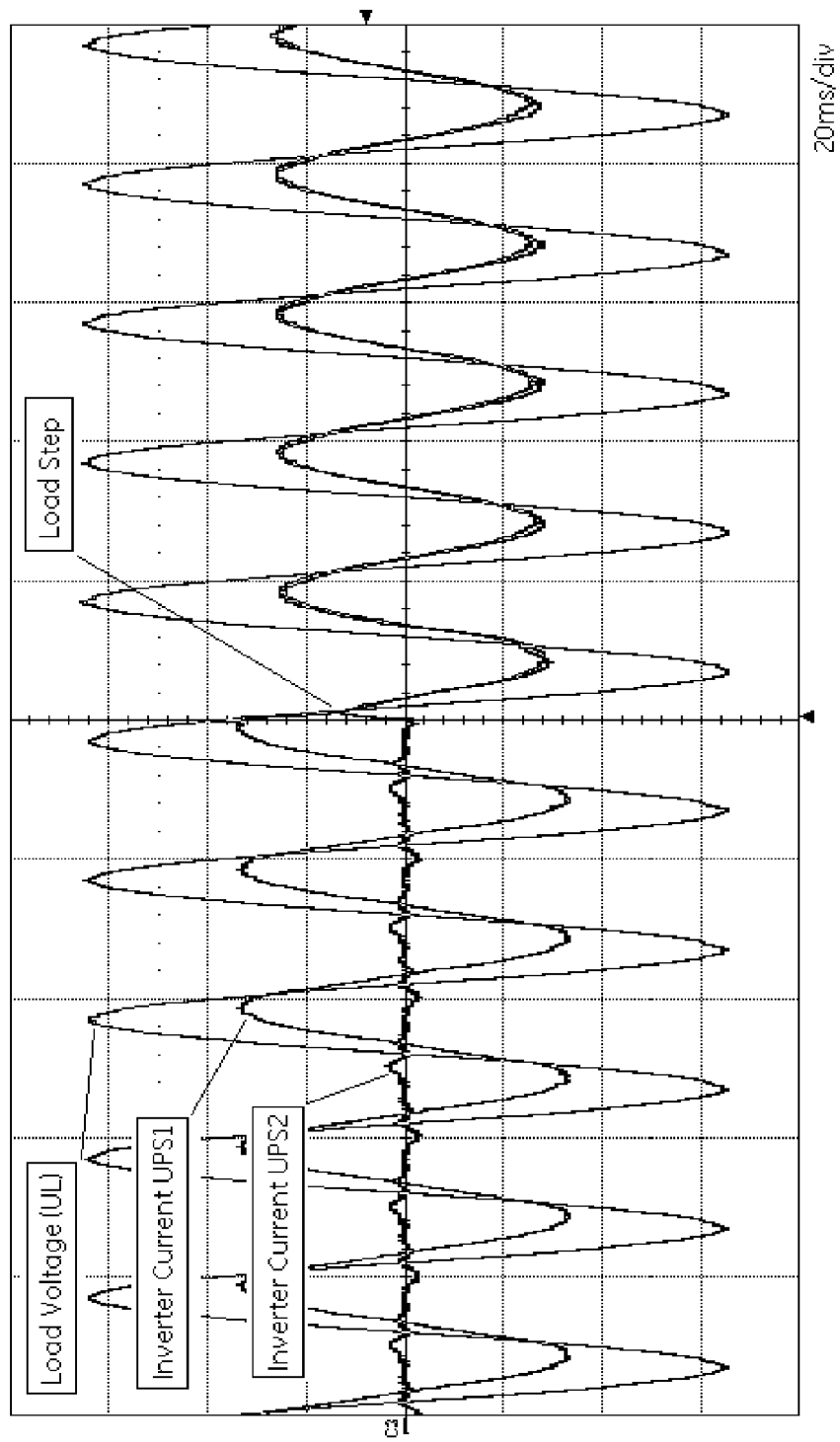
FIG. 3 depicts exemplary empirical data illustrating operational characteristics of exemplary embodiments of the invention.

Referring now to FIG. 3, data illustrating operational characteristics of exemplary embodiments of the invention is shown. FIG. 3 shows results obtained during a test when the system was operating under decreased load conditions followed by a load increase. As displayed in the graph, the inverter of UPS2 is "off" while the load is at a decreased level. When the control circuitry detects an increase in the load demand, an output signal is sent to the inverter of UPS2 to power on. This is illustrated on the graph where it is labeled "load step". As shown, the inverter of UPS2 is instantaneously switched on without any effect on the critical output voltage. The instantaneous reaction is accomplished by the output transformer of UPS2 being continuously magnetized via back feed from UPS1, while the inverter of UPS2 is off. On the other end, the excellent behavior observed on the output voltage is obtained by fast adaptation of the inverter synchronization and load-share algorithm.

This design is advantageous to previous UPS control systems. The invention facilitates magnetization of the output transformer via a back-feed from other UPS units, greatly improving system efficiency while feeding reliable and quality power to the critical load. The number of running UPSs will adaptively react to changes in the system load by dynamically switching the inverter sections of one or more UPSs "on" or "off" in response to variations in load demand. This design enables a fast reaction to load changes with UPSs transitioning to on-line operation instantaneously. This is accomplished with no compromise on the power quality of the UPS output, granted by continuous double-conversion UPS.

A clear application of the present invention is higher efficiency operation for parallel UPS installations operating in low-load conditions. As most installations operate with system load below 40% (with a relevant number of installation operating with system load below 20%) there are potential energy savings for the end customer—energy savings resulting from reduced losses when switching off one or more inverter sections Although the preferred embodiment presented relates to parallel UPS applications, it will be appreciated by those skilled in the art that the invention more generally pertains to the case of paralleled inverters. Particularly, the invention also applies to the case of grid-connected parallel inverters, where the inverters are feed by a DC voltage supply. As an example, the DC voltage may be supplied by photovoltaic converters or large energy storage. In these applications, a first feed path is connected to a DC source, and a first inverter is in circuit with the DC source. The DC power is converted to AC power via the inverter. As discussed above, the inverter is switchable "on" or "off" via a control signal, the inverter being in circuit with an output transformer and a power grid. A second inverter is connected to the first inverter in parallel. The second inverter having similar components to the first inverter, namely, a DC power source, an inverter in circuit with an output transformer and a power grid. Typically, adaptation transformers are used to couple the inverters to the power grid. Similarly to the system discussed above, the output transformer is configured to remain magnetized via a back-feed from the output transformer of the first inverter and adaptable to shut inverters "on" or "off" based upon demand.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A control system for inverters connected in parallel energized by a power source for servicing a load, comprising:
a first inverter connected to a power source by a first inverter feed path, the first inverter being switchable "on" or "off" via a control signal;
an output transformer in circuit with the first inverter and in circuit with the load via the first inverter feed path;
at least one second inverter connected to a power source by a second inverter feed path, the second inverter being switchable "on" or "off" via a control signal; and
an output transformer in circuit with the second inverter and in circuit with the load via the second inverter feed path and wherein the output transformer is configured to remain magnetized via a back-feed from the output transformer of the first inverter feed path;
control circuitry in electrical communication with each inverter;
at least one means for determining the demand of the load;
wherein the control circuitry is configured to communicate a signal to each inverter for switching it "on" or "off" to accommodate increases or decreases in load demand.

2. The control system of claim 1, wherein the power source of the first and second inverter is an AC power source.

3. The control system of claim 2 further comprising a first and second rectifier connected to the inverter feed paths, respectively, wherein the first and second rectifier is in circuit with the first and second inverter.

4. The control system of claim 1, wherein the power source of the first and second inverter is DC power source.

5. The control system of claim 1, wherein the control circuitry includes a processing circuit and a storage medium readable by the processing circuit for storing instructions for execution by the processing circuit for controlling the inverters.

6. The control system of claim 5, wherein the processing circuit receives input signals.

7. The control system of claim 6, wherein the input signals include inverter load currents and load voltages.

8. The control system of claim 6, wherein the input signals include signals from an auxiliary contact to identify the status of the control switch.

9. The control system of claim 5, wherein the processing circuit sends output signals.

10. The control system of claim 9, wherein the output signals include command signals to the inverter.

11. The control system of claim 10, wherein the output signals originate from an auxiliary source and are monitored and used by the control circuitry.

12. The control system of claim 5, wherein the storage medium stores instructions for causing magnetization of the output transformer.

13. The control system of claim 5, wherein the storage medium stores instructions for switching on or off the inverter sections in response to load changes.

14. The control system of claim 2, wherein the storage medium stores instructions for switching on one or more of the inverter sections if a fault is detected on one of the inverter feed paths currently feeding the load.

15. The control system of claim 1, wherein the control circuitry is a remote controllable contactor.

16. The control system of claim 1, wherein the means for determining the demand of the load includes sensing load demand with transducers.

17. A method for controlling a system having a first inverter and at least one second inverter energized by an power source and connected in parallel for servicing a load, each inverter having a feed path connected with the power source, the inverter being switchable "on" or "off", and an output transformer in circuit with the load, the feed path being enabled to deliver an inverter current to the load, the method comprising:
   determining the demand of the load;
   sending output signals from a control circuitry to one or more of the inverters to switch "on" or "off" in response to increases or decreases in load demand, respectively; and
   maintaining magnetization of the output transformer sections of the inverters switched "off" via a back-feed from the output transformer of the inverter feed paths that remain "on".

18. The method of claim 17 further comprising:
   providing control circuitry having a processing circuit and a storage medium readable by the processing circuit for storing instructions for execution by the processing circuit for controlling the inverters.

19. The method of claim 18, wherein the instructions include directions for causing magnetization of the output transformer.

20. The method of claim 18, wherein the instructions include directions for switching on or off the control switch of the inverter section of one or more UPSs in response to load changes.

21. A control system for uninterruptible power supplies (UPSs) energized by an AC source and connected in parallel for servicing a load, comprising:
   a first UPS which comprises:
      a feed path connected with the AC source;
      a rectifier connected to the feed path;
      an inverter in circuit with the rectifier, the inverter being switchable "on" or "off" via a control switch; and
      an output transformer in circuit with the inverter and in circuit with the load;
   at least one second UPS which comprises:
      a feed path connected with the AC source;
      a rectifier connected to the feed path;
      an inverter in circuit with the rectifier, the inverter being switchable "on" or "off" via a control switch; and
      an output transformer in circuit with the inverter and in circuit with the load and wherein the output transformer is configured to remain magnetized via a back-feed from the output transformer of the first UPS;
   a processor in electrical communication with each inverter;
   at least one sensor for detecting the demand of the load;
   wherein the processor is configured to communicate a signal to the control switch of each inverter for switching it "on" or "off" to accommodate increases or decreases in load demand.

22. A control system for inverters energized by a DC source and connected in parallel for servicing a grid, comprising:
   a first inverter which comprises:
      a feed path connected with the DC source;
      an inverter in circuit with the DC source, the inverter being switchable "on" or "off" via a control signal; and
      an output transformer in circuit with the inverter and in circuit with the grid;
   at least one second inverter which comprises:
      a feed path connected with the DC source,
      an inverter in circuit with the DC source, the inverter being switchable "on" or "off" via a control signal; and
      an output transformer in circuit with the inverter and in circuit with the grid and wherein the output transformer is configured to remain magnetized via a back-feed from the output transformer of the first inverter;
   control circuitry in electrical communication with each inverter;
   at least one means for determining the demand of the grid;
   wherein the control circuitry is configured to communicate a signal to each inverter for switching it "on" or "off" to accommodate increases or decreases in grid demand.

\* \* \* \* \*